United States Patent [19]

Bekkema

[11] Patent Number: 4,841,205
[45] Date of Patent: Jun. 20, 1989

[54] CONTROL DEVICE FOR A MOVABLE PART, DESIGNED FOR OPENING AND CLOSING AN OPENING, ESPECIALLY A SLIDING/TILTING ROOF FOR A VEHICLE

[75] Inventor: Jeen Bekkema, Venlo, Netherlands

[73] Assignee: Vermeulen-Hollandia Octrooien II B.V., Netherlands

[21] Appl. No.: 146,253

[22] Filed: Jan. 20, 1988

[30] Foreign Application Priority Data

Jan. 23, 1987 [NL] Netherlands .................. 8700159

[51] Int. Cl.$^4$ .................................................. H02P 5/00
[52] U.S. Cl. .................................... 318/282; 318/266; 318/468
[58] Field of Search ................... 318/280–282, 318/466–468, 264–266; 335/103, 107, 133; 307/10 R

[56] References Cited

U.S. PATENT DOCUMENTS

| | | | |
|---|---|---|---|
| 4,007,409 | 2/1977 | Thibaut | 318/459 |
| 4,052,625 | 10/1977 | Cameron | 318/345 G |
| 4,164,692 | 8/1979 | Mitterer et al. | 318/468 |
| 4,191,914 | 3/1980 | Lecluse | 318/493 |
| 4,260,939 | 4/1981 | Knauff | 318/558 |
| 4,329,594 | 5/1982 | Bohm | 318/468 |
| 4,617,541 | 10/1986 | Chuang | 335/133 |
| 4,663,537 | 5/1987 | Göldner et al. | 318/434 |

Primary Examiner—William M. Shoop, Jr.
Assistant Examiner—David S. Martin
Attorney, Agent, or Firm—Kinney & Lange

[57] ABSTRACT

A control device for a movable part, especially a sliding/tilting roof of a vehicle, comprises a motor for driving the movable part, wherein the terminals of the motor can be selectively connected to different poles of a power source by means of make-and-break contacts of corresponding relays, which make-and-break contacts each connect the corresponding terminal of the motor with the negative pole of the power source when the corresponding relay is not excited, and with the positive pole of the power source when the corresponding relay is excited. A first switch is provided, which is actuated through a control member driven by the motor and which interrupts the connection of the motor with the poles of the power source when the movable part reaches its closed position. A second manually operable switch with non-connected rest position is provided for alternately connecting one side of the excitation windings of both relays with the positive pole of the power source, whereas the other side of the excitation windings are directly connected with the negative pole of the power source. A switching circuit is provided, in which the first switch is connected and which, when the movable part reaches the closed position, excites the relay, which is not excited for operating the movable part.

2 Claims, 2 Drawing Sheets

CONTROL DEVICE FOR A MOVABLE PART, DESIGNED FOR OPENING AND CLOSING AN OPENING, ESPECIALLY A SLIDING/TILTING ROOF FOR A VEHICLE

BACKGROUND OF THE INVENTION

The invention relates to a control device for a movable part, designed for opening and closing an opening, especially a sliding/tilting roof of a vehicle, comprising a motor for driving the movable part, wherein the terminals of the motor can be selectively connected to different poles of a power source by means of a pole reversing switch and wherein a first switch is provided, which is actuated through a control member driven by the motor and which interrupts the connection of the motor with the poles of the power source when the movable part reaches its closed position.

Such a control device is known from DE-B-2.454.723. In this known control device the pole reversing switch is a double-pole manually operable switch which, with operating motor, carries the motor current and which has to be mounted within the reach of the driver of the vehicle. The first switch controls in this case an impulse relay, a contact of which is connected in the connection line of the motor. Although this known control device is relatively simple, it shows a plurality of disadvantages. First, it is a disadvantage to mount a switch for switching high currents within the reach of the driver, because the required cables must have a relatively big diameter and interferences can be caused in other adjacent electronic devices. Moreover, a double-pole manually operable pole reversing switch is relatively expensive. The impulse relay used in the known control device is a relatively expensive relay which is susceptable of failure. Moreover, the switching operation of such an impulse relay is rather audible so that the automobile manufacturer, making high demands upon the comfort in the passengers cabin of the motor-car is forced to mount the relay on a remote location in the motor-car which increases the mounting costs.

SUMMARY OF THE INVENTION

It is the object of the invention to provide a control device of the above mentioned type wherein said disadvantages are obviated in a simple but nevertheless effective manner.

It is a further object of the invention to provide a control device which can be manufactured with relatively simple, standard components.

A further object of the invention is to provide a control device with a substantially noiseless operation.

To this end the control device according to the invention is characterized in that the pole reversing switch contains a make-and-break contact of a relay on both sides of the motor, which make-and-break contacts each connect the corresponding terminal of the motor with the one pole of the power source when the corresponding relay is not excited and with the other pole of the power source when the relay is excited, wherein the excitation windings of both relays on one hand are connected with the one pole of the power source and on the other hand are alternately connectable with the other pole of the power source via a second, manually operable switch with non-connected rest position, wherein a switching circuit is provided, in which the first switch is connected and which, when the movable part reaches the closed position, connects the excitation winding of the relay, which is not connected by the second switch with the other pole of the power source for operating the movable part, with this other pole.

In this manner a control device is obtained, wherein the motor current is switched by relays, whereas the manually operable second switch, which is made as a singlepole switch, only has to carry the excitation currents of the relays. Instead of the impulse relay two standard relays are used which are substantially less susceptable of failure than an impulse relay. Moreover, such relays operate substantially noiseless so that the relays can be mounted near the sliding/tilting roof.

According to a preferred embodiment of the invention the switching circuit is provided with a diode bridge and an auxiliary relay with a make contact, wherein the anode/cathode junctions of the diode bridge each are connected with that side of one of the excitation windings of the relays, which is connected with the second switch, while the excitation winding of the auxiliary relay is connectable with both other junctions of the diode bridge through the first switch, wherein the make contact of the auxiliary relay is connected in parallel to the contact of the first switch, which is closed when the movable part is in its open position. Thereby the control device can be made completely with standard components of high reliability so that the control device can be made at low costs and a failure free operation is guaranteed.

BRIEF DESCRIPTION OF THE DRAWINGS

The invention will be further explained by reference to the drawings in which a preferred embodiment of the control device according to the invention is schematically shown.

DETAILED DESCRIPTION OF THE PREFERRED EMBODIMENT

Figure 1:
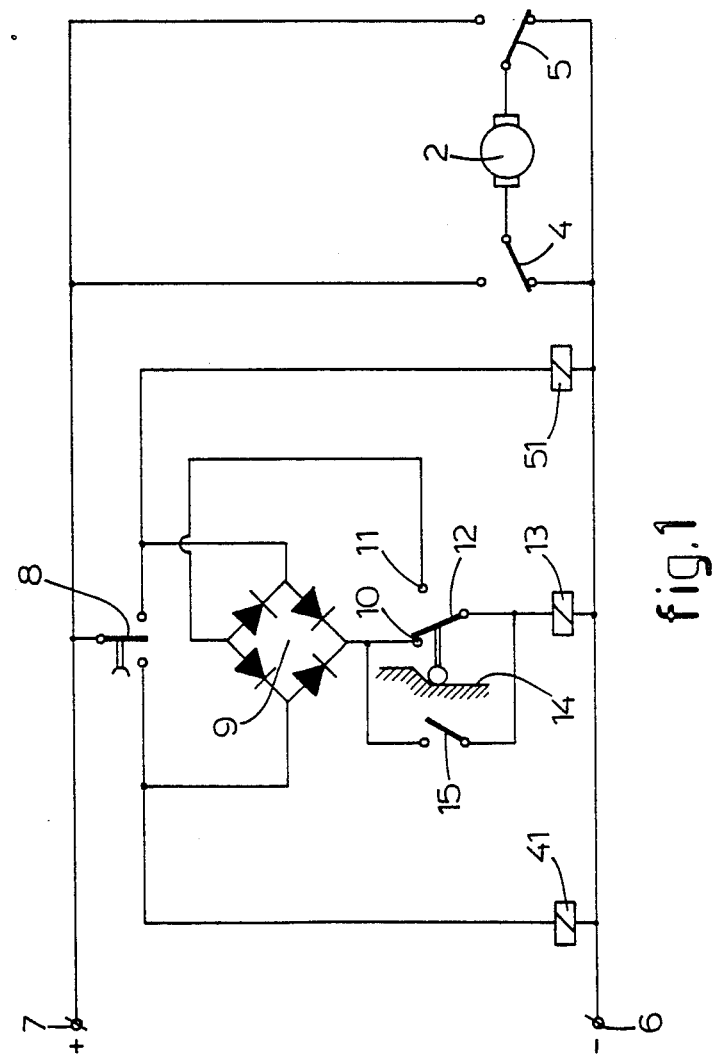
FIG. 1 shows a circuit diagram of a preferred embodiment of the invention.

Referring to FIG. 1, there is shown a control device for a sliding/tilting roof 1 for opening and closing an opening in a roof of a motor-vehicle not further shown. The sliding/tilting roof 1 can be driven by means of an electromotor 2 which is connected to the sliding/tilting roof 1 through a schematically indicated coupling 3. The terminals of the electromotor 2 each are connectable to the negative pole 6 and the positive pole 7 of a voltage source not shown through a make-and-break contact 4 and 5, respectively. The make-and-break contacts 4 and 5 together form a pole reversing switch, through which the electromotor 2 can be connected to the voltage source for operation in a first or the opposite rotation direction.

The make-and-break contacts 4 and 5 belong to relays 41 and 51, respectively, the excitation windings of which are directly connected to the negative pole 6 on the one side, whereas the other side of the excitation windings 41 and 51 can be connected to the positive pole 7 through a manually operable switch 8. The switch 8 has an open rest position determined by a spring not shown, the rest position being shown in FIG. 1.

To the side of the excitation windings 41, 51 connected to the switch 8, the anode/cathode junctions of a diode bridge 9 are connected, while the two further junctions of the diode bridge 9 are connected to the contacts 10 and 11 of a switch 12, through which the excitation winding of an auxiliary relay 13 can be connected to said two junctions of the diode bridge 9. The other side of the excitation winding of the auxiliary relay 13 is directly connected to the negative pole 6. The switch 12 is operable by a schematically shown control member 14 driven by the motor 2. In the position of the switch 12 shown in FIG. 1, the sliding/tilting roof is in an open position. The auxiliary relay 13 has a make contact 15 connected in parallel to the contact 10 of the switch 12.

Figure 2:
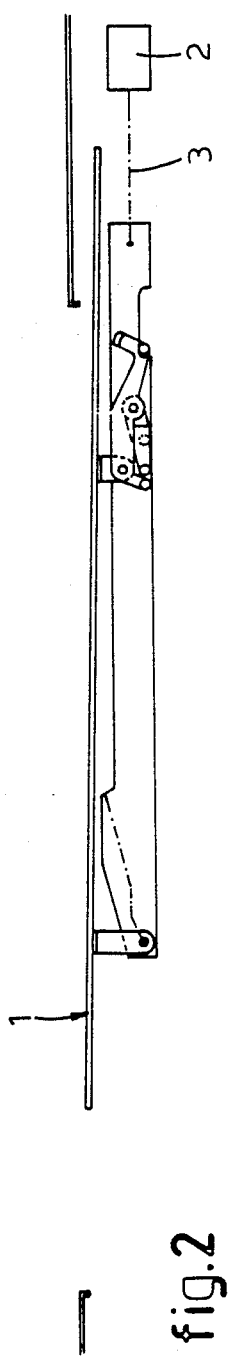
FIGS. 2-4 schematically show a sliding/tilting roof in several possible positions.
Figure 3:
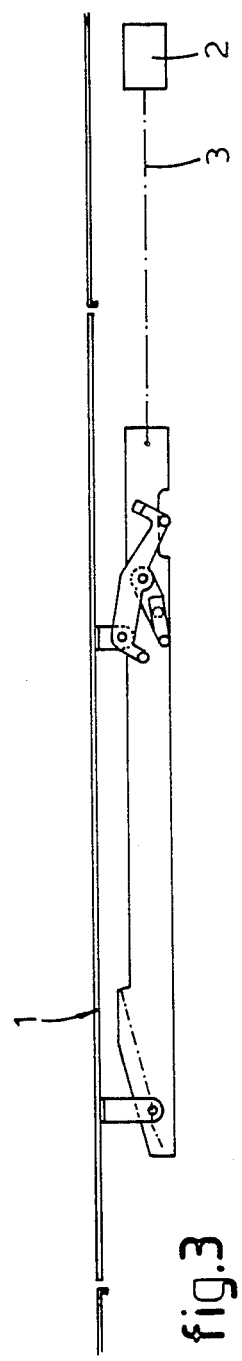

When the sliding/tilting roof 1 has to be moved from the closed position shown in FIG. 3 to the open position shown in FIG. 2, the manually operable switch 8 is actuated for exciting the relay 41, whereby the make-and-break contact 4 connects the corresponding terminal of the electromotor 2 to the positive pole 7, while the other terminal of the electromotor remains connected to the negative pole 6 through the make-and-break contact 5. At the corresponding anode/cathode junction of the diode bridge 9 a positive voltage will appear which is led to the contact 10 of the switch 12. As the sliding/tilting roof 1 is in the closed position, the contact arm of the switch 12 is contacting the contact 11 so that the auxiliary relay 13 will not yet be excited. The positive voltage on the excitation winding 41 cannot be led to the excitation winding 51 through the diode bridge 9. As soon as the sliding/tilting roof 1 leaves the closed position, the contact arm of switch 12 switches over to the contact 10 so that the auxiliary relay 13 will be excited and the make contact 15 will be closed. The opening of the sliding/tilting roof 1 is ended by releasing the switch 8 or by reaching a not shown stop, in which case the electromotor 2 can be switched off in the usual manner.

In order to move the sliding/tilting roof 1 into the closed position again, the switch 8 is operated for exciting the excitation winding 51, whereby the make-and-break contact 5 connects the corresponding terminal of the motor 2 to the positive pole 7 and the other terminal remains connected to the negative pole 6 through the make-and-break contact 4. The motor now rotates in the reversed direction and moves the sliding/tilting roof 1 from the open position shown in FIG. 2 to the closed position of FIG. 3. By actuating switch 8 a positive voltage is led to the contact 10 again through the corresponding anode/cathode junction of the diode bridge 9, so that the auxiliary relay 13 is excited and the make contact 15 is closed. When the closed position of FIG. 3 is reached, the contact arm of switch 12 is switched over from contact 10 to contact 11, wherein, however, the auxiliary relay 13 remains excited through the make contact 15. Moreover, the positive voltage on contact 10 is passed to the excitation winding 41 through the make contact 15, the contact 11 and the diode bridge 9, so that the make-and-break contact 4 is switched over. Thereby the motor 2 is short circuited through its connections to the positive pole 7 and the movement of the sliding/tilting roof 1 is stopped.

Figure 4:
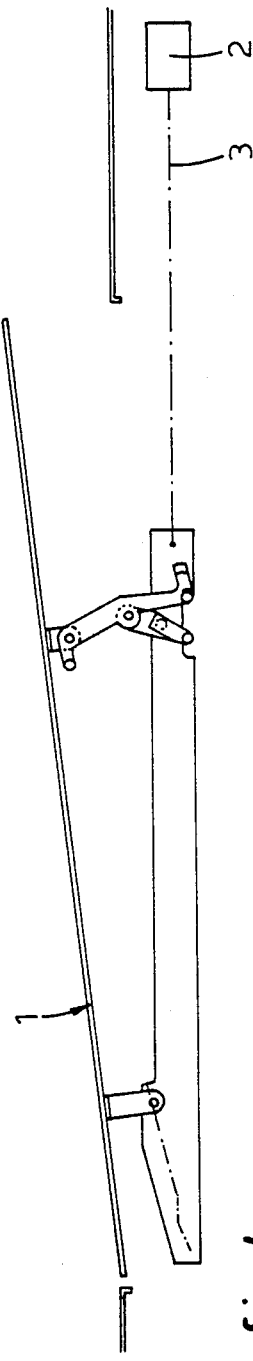

When the switch 8 is now released and actuated again for exciting the excitation winding 51, the sliding/tilting roof 1 will be pivoted to the position shown in FIG. 4. Also in this case the auxiliary relay 13 will only be excited when the sliding/tilting roof is moved out of the closed position so that the relay 41 will not be excited.

In order to pivot the sliding/tilting roof 1 to the closed position of FIG. 3 again, the switch 8 is actuated for exciting the excitation winding 41. At reaching the closed position the contact arm of switch 12 will be switched over from contact 10 to contact 11, wherein the auxiliary relay 13 remains excited through the make contact 15 so that in this case relay 51 is excited by the positive voltage on contact 10, through the make contact 15, the switch 12 and the diode bridge 9.

From the foregoing it appears that the invention provides a control device for a sliding/tilting roof, which is fully made with standard components so that the control device can be manufactured at relatively low costs. Further, the manually operable switch 8 can be made as a single-pole switch which only has to carry the excitation currents for the relays 13, 41 and 51, so that this switch can be mounted within the reach of the driver of the motor vehicle without any objections. The connection wires to be connected to this switch may have a relatively small diameter, which results in a further reduction of the cost price. Moreover, the used standard relays have a substantially noiseless operation so that they can be mounted near the sliding/tilting roof without any objections. Such standard relays moreover have a very reliable operation so that a failure free operation of the control device is guaranteed.

The invention is not restricted to the above described embodiment which can be varied in a number of ways within the scope of the claims.

I claim:

1. A control device for a movable part designed for opening and closing an opening, especially a sliding-/tilting roof of a vehicle, comprising:
 a motor for driving the movable part and having terminals for connection to different poles of a power source;
 a pole reversing switch for selectively connecting the terminals of the motor to said different poles of the power source;
 a control member driven by the motor;
 a first switch actuated by said control member for interrupting the connection of the terminals of the motor with the poles of the power source when the movable part reaches a closed position;
 a second manually operable switch with a normally assumed non-connected rest position and first and second connected positions;
 first and second relays, associated with the pole reversing switch;
 said pole reversing switch including a separate make-and-break contact connected to each terminal of the motor and controlled by one of the relays, respectively, which make-and-break contacts each connect the corresponding terminal of the motor with one pole of the power source when the corresponding relay is not excited and with the other pole of the power source when the corresponding relay is excited, first ends of the excitation windings of both relays being connected with the one pole of the power source and second ends of the excitation windings being alternately connectable with the other pole of the power source through the respective connected positions of said second manually operable switch; and
 a switching circuit, in which the first switch is connected, and which first switch, when the movable part reaches the closed position upon actuation of the manually operable switch to a connected position for one relay, connects the excitation winding of the other relay with the other pole of the power source for connection of both poles of the motor to the other pole of the power source.

2. A control device for a movable part designed for opening and closing an opening, especially a sliding-/tilting roof of a vehicle, comprising:
- a motor for driving the movable part and having terminals for connection to different places of a power source;
- a pole reversing switch for selectively connecting the terminals of the motor to said different poles of the power source;
- a control member driven by the motor;
- a first switch actuated by said control member for interrupting the connection of the motor with the poles of the power source when the movable part reaches its closed position;
- a second manually operable switch with a non-connected rest position and second connected positions;
- said pole reversing switch including a separate relay operating separate make-and-break contacts leading to each terminal of the motor, respectively, which make-and-break contacts each connect the corresponding terminal of the motor with the one pole of the power source when the corresponding relay is not excited and with the other pole of the power source when the corresponding relay is excited, wherein the excitation windings of both relays are connected with the one pole of the power source at first ends thereof and are alternately connectable with the other pole of the power source via said second manually operable switch at second ends thereof;
- a switching circuit, in which the first switch is connected and which when the movable part reaches the closed position upon actuation of the motor through the second manually operable switch, connects the excitation winding of the relay, which is not connected by the second manually operable switch with the other pole of the power source for operating the movable part, with this other pole; and
- said switching circuit being provided with a diode bridge and an auxiliary relay with a make contact, the diode bridge having anode/cathode junctions and two other junctions, and wherein the anode/cathode junctions of the diode bridge each are connected with the second end of one of the excitation windings of the separate relays and which ends are also connected with the second manually operable switch, while the excitation winding of the auxiliary relay is alternately connectable with either of the other junctions of the diode bridge through the first switch, wherein the make contact of the auxiliary relay is connected in parallel to the contact of the first switch which is closed when the movable part is in its open position.

* * * * *